(12) United States Patent
Marengo

(10) Patent No.: US 10,976,067 B2
(45) Date of Patent: Apr. 13, 2021

(54) EXPLOITATION OF A PHOTOVOLTAIC SYSTEM COUPLED TO A JOINT WATER BOILER-AIR/AIR HEAT PUMP AIR CONDITIONING SYSTEM

(71) Applicant: ALBASOLAR S.r.l., Alba (IT)

(72) Inventor: Massimo Marengo, Alba (IT)

(73) Assignee: ALBASOLAR S.R.L.

( * ) Notice: Subject to any disclaimer, the term of this patent is extended or adjusted under 35 U.S.C. 154(b) by 173 days.

(21) Appl. No.: 16/442,213

(22) Filed: Jun. 14, 2019

(65) Prior Publication Data
US 2020/0393154 A1 Dec. 17, 2020

(51) Int. Cl.
| | |
|---|---|
| *F24F 11/46* | (2018.01) |
| *F24F 11/65* | (2018.01) |
| *F24F 11/88* | (2018.01) |
| *F24D 3/00* | (2006.01) |
| *F24D 19/10* | (2006.01) |

(Continued)

(52) U.S. Cl.
CPC ............. *F24F 11/46* (2018.01); *F24D 3/005* (2013.01); *F24D 19/1078* (2013.01); *F24F 11/65* (2018.01); *F24F 11/88* (2018.01); *G05B 19/042* (2013.01); *H02S 50/00* (2013.01);
(Continued)

(58) Field of Classification Search
CPC .. F24F 11/46; F24F 11/88; F24F 11/65; F24F 2140/60; F24F 2140/50; G05B 19/042; G05B 2219/2614; F24D 19/1078; F24D 3/005; H02S 50/00; Y02E 10/50
See application file for complete search history.

(56) References Cited

U.S. PATENT DOCUMENTS

| | | | |
|---|---|---|---|
| 8,560,135 B2 * | 10/2013 | Tomita | H02J 3/32 700/291 |
| 8,972,073 B2 * | 3/2015 | Hayashida | G06Q 10/06 700/295 |

(Continued)

FOREIGN PATENT DOCUMENTS

| | | |
|---|---|---|
| CN | 205227491 U | 5/2016 |
| WO | WO 2012/004644 A1 | 1/2012 |

OTHER PUBLICATIONS

European Search Report from EP Application No. 17207858.6, dated Jul. 5, 2018, pp. 1-5.

*Primary Examiner* — Charles R Kasenge
(74) *Attorney, Agent, or Firm* — The Belles Group, P.C.

(57) ABSTRACT

In a joint water boiler-air/air heat pump air conditioning system coupled to a photovoltaic system and intended to air condition a closed environment formed by one or more rooms and comprising an electrical system to which electrical appliances are connected, an electronic control system is programmed to compute electrical power production of the photovoltaic system and electrical power consumption of the electrical appliances in the closed environment, and, based thereon, a surplus electrical power production of the photovoltaic system with respect to the electrical power consumption of the electrical appliances in the closed environment. If a surplus of electrical power production of the photovoltaic system is determined to exist with respect to the electrical power consumption of the electrical appliances in the closed environment, it may be determined how many indoor units of the hot/cold air/air heat pump system can be electrically supplied simultaneously with the electrical power surplus.

7 Claims, 1 Drawing Sheet

(51) Int. Cl.
    *G05B 19/042*    (2006.01)
    *H02S 50/00*     (2014.01)
    *F24F 140/50*    (2018.01)
    *F24F 140/60*    (2018.01)

(52) U.S. Cl.
    CPC ....... *F24F 2140/50* (2018.01); *F24F 2140/60* (2018.01); *G05B 2219/2614* (2013.01); *Y02E 10/50* (2013.01)

(56) References Cited

U.S. PATENT DOCUMENTS

| | | | | |
|---|---|---|---|---|
| 9,037,307 | B2* | 5/2015 | Kaji | H02J 3/32 700/291 |
| 9,261,284 | B2* | 2/2016 | Hayashida | F24D 19/1054 |
| 9,267,719 | B2* | 2/2016 | Hayashida | F24D 11/002 |
| 9,494,373 | B2* | 11/2016 | Hayashida | F24D 11/0214 |
| 9,557,068 | B2* | 1/2017 | Honma | F24D 19/1063 |
| 9,677,784 | B2* | 6/2017 | Hayashida | H02J 3/386 |
| 10,247,436 | B2* | 4/2019 | Carlson | F24F 11/77 |
| 2008/0092875 | A1 | 4/2008 | Leifer et al. | |
| 2010/0312425 | A1* | 12/2010 | Obayashi | B60W 20/10 701/22 |
| 2012/0065793 | A1* | 3/2012 | Kaji | H02J 13/0017 700/291 |
| 2012/0072040 | A1* | 3/2012 | Kaji | H02J 3/14 700/291 |
| 2012/0205456 | A1* | 8/2012 | Honma | F24D 19/1045 237/2 B |
| 2012/0232706 | A1* | 9/2012 | Hayashida | H02J 3/14 700/282 |
| 2012/0235478 | A1* | 9/2012 | Hayashida | F24D 19/1054 307/11 |
| 2013/0205814 | A1* | 8/2013 | Hayashida | H02J 3/14 62/115 |
| 2013/0220591 | A1* | 8/2013 | Hayashida | F25B 30/00 165/287 |
| 2017/0336815 | A1* | 11/2017 | Smith, Jr. | F24D 5/005 |
| 2018/0066860 | A1* | 3/2018 | Carlson | F24F 11/46 |

* cited by examiner

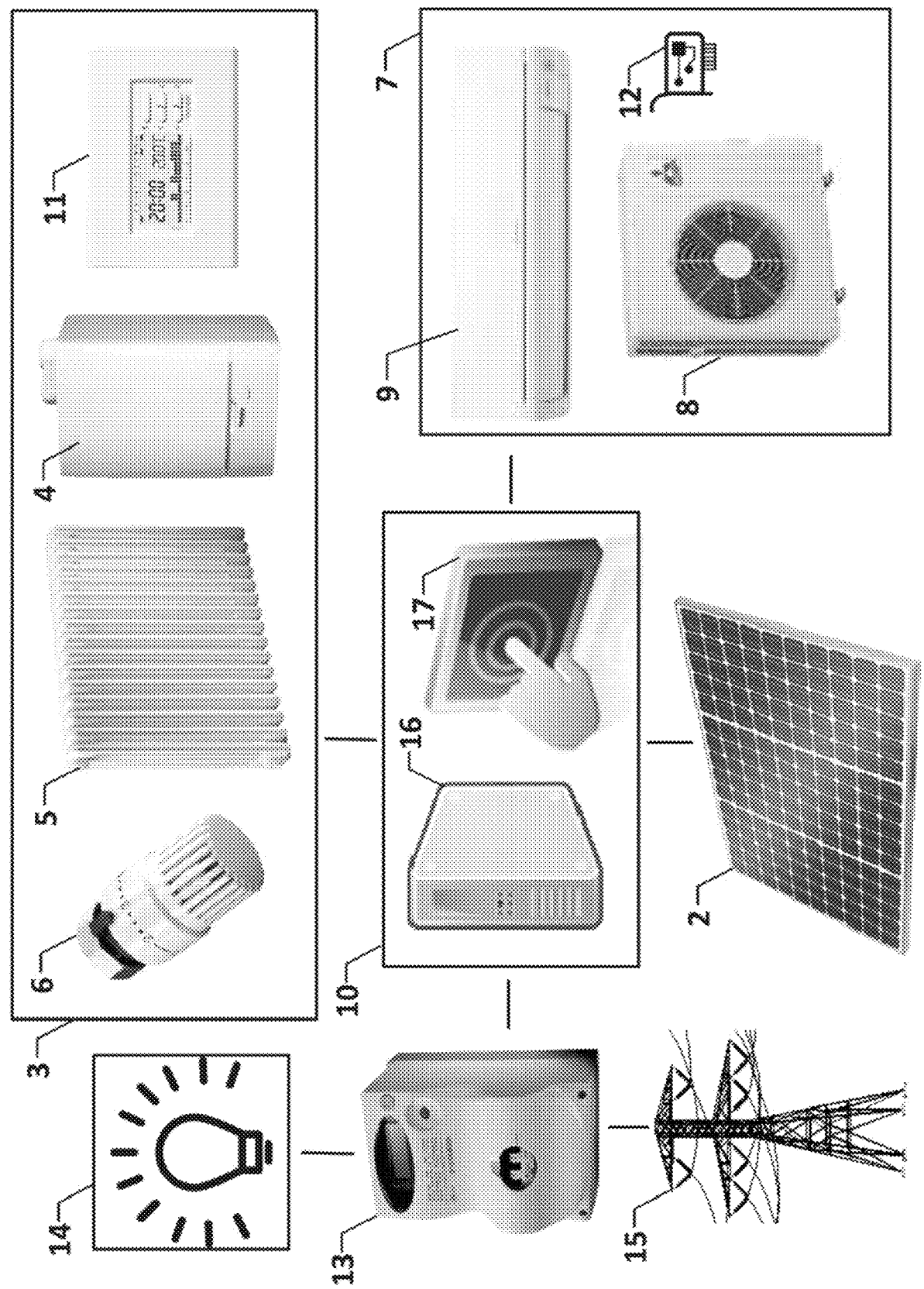

EXPLOITATION OF A PHOTOVOLTAIC SYSTEM COUPLED TO A JOINT WATER BOILER-AIR/AIR HEAT PUMP AIR CONDITIONING SYSTEM

TECHNICAL SECTOR OF THE INVENTION

The present invention relates to exploitation of a photovoltaic system coupled to a joint water boiler-air/air heat pump air conditioning system.

The present invention finds advantageous, though not exclusive, application in the civil sector to electrically supply a joint water boiler air/air heat pump air conditioning system to air condition environments intended for residential use, urban use, work purposes, for practicing a profession or supplying a service, to which the following description will refer without any loss of generality.

TECHNICAL SECTOR OF THE INVENTION

As is known, air conditioning systems to heat and cool closed environments generally comprise the following subsystems:

- an energy production/transformation system (heating or cooling),
- a vector fluid (water, air, refrigerant gases) distributing network,
- distribution terminals (by convection, conduction, radiation), and
- a temperature regulation system (control units, chronothermostats, thermostatic valves).

Known energy production/transformation systems include those comprising water boilers and heat pumps, which are increasingly coupled to each other to form joint water boiler/heat pump air conditioning systems, and to photovoltaic systems to exploit electrical energy produced thereby for electrical power supply.

OBJECT AND ABSTRACT OF THE INVENTION

It is an object of the present invention to provide a solution which maximizes the level of energy exploitation efficiency in all residential and commercial environments, and, in particular, which maximizes exploitation of the electrical power produced by the photovoltaic systems coupled to joint water boiler-air/air heat pump air conditioning systems to air condition these environments in presence of sun.

This object is achieved by the present invention, which relates to an electronic control system for a joint water boiler-air/air heat pump air conditioning system coupled to a photovoltaic system, as claimed in the appended claims.

BRIEF DESCRIPTION OF THE DRAWINGS

FIG. 1 shows a block diagram of a joint water boiler-air/air heat pump air conditioning system coupled to a photovoltaic system according to an embodiment of the present invention.

DETAILED DESCRIPTION OF A PREFERRED EMBODIMENT OF THE INVENTION

The following description is provided to allow a skilled person to produce and use the invention. Various modifications to the presented embodiments will become immediately apparent to experts, and the general principles disclosed herein may be applied to other embodiments and applications, without departing from the scope of protection of the present invention as defined by the appended claims. Thus, the present invention has not to be understood as limited to the embodiments described and shown, but it must be granted the widest scope of protection in line with the principles and characteristics presented herein and defined in the appended claims.

FIG. 1 shows a block diagram of a joint water boiler-air/air heat pump air conditioning system 1 for a closed environment of the type indicated above and coupled to a photovoltaic system 2 with supply of the produced electrical power to the public electrical power mains, with or without economic incentive, and with or without local storage.

The joint water boiler-air/air heat pump air conditioning system 1 comprises:

- a radiator heating system 3 comprising a water boiler 4 of any kind (gas, pellet, LNG, LPG, diesel, wood) to produce hot water, and radiators (or thermosiphons or heaters) 5 installed in various rooms forming the closed environment to be air conditioned, fluidically connected to the water boiler 4 to be flown through by hot water, and provided with respective thermostatic valves 6 to allow desired temperatures in the rooms in which the radiators 5 are installed to be set, so as to prevent the passage of the hot water in the radiators 5 when the temperatures in the rooms teach the set desired temperatures;
- an electrically powered hot/cold air/air heat pump system 7 comprising one or more outdoor units 8 and one or more indoor units 9, also known as splits, of all types (floor- or wall-installed or channeled) installed in the rooms of the closed environment to be air conditioned, with independent temperature, both hot and cold, management and setting; and
- an electronic control system 10 comprising:
  - one or more (chrono)thermostats 11 to switch on/off the water boiler 4 and installed in one or more of the rooms of the closed environment to be air conditioned;
  - a network board 12 associated with each indoor unit 9 of the hot/cold air/air heat pump system 7 to allow the associated indoor unit 9 to be remotely switched on/off;
  - an electronic electrical power meter 13 connected, on the one hand, to the photovoltaic system 2 and to the electrical system (not shown) in the closed environment and through which the various electrical appliances 14 therein, such as, for example, internal and external light sources, household appliances, the hot/cold air/air heat pump system 7, etc., can be electrically supplied and, on the other hand, to the public electrical power mains 15, and configured to measure electrical power production of the photovoltaic system 2 and electrical power absorbed from, or supplied to, the public electrical power mains 15 as a result of an electrical power underproduction or overproduction of the photovoltaic system 2 with respect to the electrical power consumption of the electrical appliances 14 in the closed environment; and
  - an electronic control unit 16, conveniently in the form of a (micro-) programmable logic controller (PLC), connected to the (chrono)thermostats 11 of the water boiler 4, to the network boards 12 of the indoor units 9 of the hot/cold air/air heat pump system 7, and to the electronic electrical power meter 13 through a wired data bus network to guarantee maximum reliability, exploiting existing passages, and provided with a touch screen 17 to allow the electronic control unit 16 to be programmed and manual commands to be imparted, and to be conveniently installed in an accessible and convenient place in the closed environment, and on which a proprietary management software is installed to allow operation of the joint water boiler-air/air heat pump air conditioning system 1 to be managed based on electrical power production of the photovoltaic system 2, as described herein below in detail.

The indoor units 9 of the hot/cold air/air heat pump system 7 are preferably of the wall-mounted type with energy efficiency class A+++ on heating, with a 3D temperature and presence sensor, so as to allow, on the one hand, people in the rooms in which they are installed to be detected by means of the presence sensor, in order to allow the produced air flow to be selectively directed, by means of internal motorized air vents, away from people in the rooms so as to avoid them feeling unpleasant sensation of air on them, whether it is hot or cold (the so-called "avoid me" function), and also temperatures in the coldest points of the rooms, usually on the floor, to be measured by means of the 3D temperature sensor via a heat detection infrared beam.

Conveniently, the hot/cold air/air heat pump system 7 comprises several independent outdoor units 8 to allow loads and electrical consumption of the hot/cold air/air heat pump system 7 to be partialized so as to allow the photovoltaic system 2 to supply also only one or a few of the indoor units 9, which consume a few hundred watts each. Whereas this is not possible with hot/cold water/fair heat pump systems because their consumptions are poorly partilizable and significantly larger.

The management software installed on the PLC 16 is designed to display on the display 17 of the PLC 16 a graphical user interface (GUI) through which a user can interact with the joint water boiler-air/air heat pump air conditioning system 1, and in particular, select the various operating modes provided and program their hourly daily operation, and receive various information related to its operation.

In greater detail, the management software is designed to allow selections to be made according to a hierarchical order, and in particular, to make:
  a main selection between a manual operating mode, in which the operation of the joint water boiler-air/air heat pump air conditioning system 1 is controllable by the user by means of direct actions on the various components of the joint water boiler-air/air heat pump air conditioning system 1 (temperature settings on the (chrono)thermostats 11 of the water boiler 4, settings on the remote controls of the indoor units 9 of the hot scold air/air heat pump system 7, etc.), and an automatic operating mode, in which the operation of the joint water boiler-air/air heat pump air conditioning system 1 is completely controlled by the management software,
  in the automatic operating mode, a secondary selection between a heating mode, a cooling mode and a dehumidification mode, and
  both in the heating mode and in the cooling mode, a tertiary selection between an operating mode called "at home", suitable for when people are present in the closed environment, an operating mode called "away from home", suitable for when no people are present in the closed environment, and an operating mode called "holiday" specifically for exploiting only the electrical power produced by the photovoltaic system 2.

In relation to the heating and cooling modes, the management software is further designed to allow priorities to be programmed, namely the switching on/off time sequence of the indoor units 9 of the hot/cold air/air heat pump system 7 during the day, for example, first the one in the kitchen, then the one in the living room, and finally, those in the bedrooms, as well as the switching on/off temperatures of the indoor units 9 of the hot/cold air/air heat pump system 7, which should conveniently be set to be the same as, or close to, those set on the thermostatic valves 6 of the radiators 5 arranged in the same rooms, so that the indoor units 9 the hot/cold air/air heat pump system 7 are cause to operate so that they tend to reach the temperatures set on the thermostatic valves 6.

Again in relation to the heating and cooling modes, in both operating modes the management software is further designed to implement a proprietary strategy of management of the joint water boiler-air/air heat pump air conditioning system 1, which strategy is the result of the dual observation that the photovoltaic system 2 has an average electric power production curve which grows from the morning peaking between twelve and one o'clock, subsequently decreasing until zero at sunset, and that the surplus electrical power production of the photovoltaic system 2 with respect to the electrical power consumption of the electrical appliances 14 in the closed environment is supplied to the public electrical power mains 15 at a cost that is currently very low, about eight to ten times lower than the gross purchase price paid by a user to the electricity companies that produce or sell electrical power.

In particular, with regard to the management of the hot/cold air/air heat pump system 7, the management software is designed to:
  receive data from the (chrono)thermostats 11 of the water boiler 4, from the network boards 12 of the indoor units 9 of the hot/cold air/air heat pump system 7, and from the electronic electrical power meter 13;
  constantly monitor, based on the received data, the electrical power production of the photovoltaic system 2 and the electrical power consumption of the electrical appliances 14 in the closed environment and, based thereon, the surplus electrical power production of the photovoltaic system 2 with respect to the electrical power consumption of the electrical appliances 14 in the closed environment, and that, for such reason, would be supplied to the public electrical power mains 15 at a very low cost, and if it is determined that there is a surplus of electrical power production of the photovoltaic system 2 with respect to the electrical power consumption of the electrical appliances 14 in the closed environment, compute the maximum number of indoor units 9 of the hot/cold air/air heat pump system 7 which can be supplied simultaneously with the electrical power surplus;
  if the surplus electrical power production of the photovoltaic system 2 is determined to be enough to supply one or more indoor units 9 of the hot/cold air/air heat pump system 7 simultaneously, check whether there are indoor units 9 of the hot/cold air/air heat pump system 7 that are scheduled to be simultaneously switched on; and
  if there are indoor units 9 of the hot/cold air/air heat pump system 7 that are scheduled to be simultaneously switched on, switch on those indoor units 9 of the hot/cold air/air heat pump system 7 that are scheduled to be switched on based on the programmed switching on priorities and in a number no greater than the maximum number of indoor units 9 of the hot/cold air/air heat pump system 7 which can be electrically supplied simultaneously with the electrical power surplus of the photovoltaic system 2.

Thanks to this operating mode, should the surplus electrical power production of the photovoltaic system 2 with respect to the electrical power consumption of the electrical appliances 14 in the closed environment grow during the day, as is normally the case on a sunny day, then the management software causes the surplus electrical power to be exploited to supply the indoor units 9 of the hot/cold air/air heat pump system 7 that are scheduled to be switched on, instead of being supplied to the public electrical power mains 15 at a very low cost.

Should instead the surplus electrical power production of the photovoltaic system 2 with respect to the electrical power consumption of the electrical appliances 14 in the closed environment fail to grow, but actually decrease during the day, as a result, for example, of a gradual clouding over or the approaching of sunset, the management software causes the gradual switching off of the indoor units 9 of the hot/cold air/air heat pump system 7 which are on, as the surplus electrical power gradually decreases.

In both cases, the management software adjust the operation of the hot/cold air/air heat pump system 7 so as to maximize exploitation of the electrical power production of the photovoltaic system 2 to electrically supply the hot/cold air/air heat pump system 7, consequently minimizing the electrical power adsorption from the public electrical power mains 15 to supply the same.

With regard to the operating mode "at home", the management software is designed to give priority to reaching the temperatures set on the (chrono)thermostats 11 arranged in the closed environment due to the presence of people in the same. In order to do this, the management software is designed to cause the water boiler 4 and the indoor units 9 of the hot/cold air/air heat pump system 7 to operate together in a programmed mode, namely by checking, first of all, whether the temperatures set on the various (chrono)thermostats 11 can be reached in a predetermined time span using only the indoor units 9 of the hot/cold air/air heat pump system 7, and, if so, keeping the water boiler 4 switched off and activating only the indoor units 9 of the hot/cold air/air heat pump system 7, and, if not, also switching on the water boiler 4 in addition to the indoor units 9 of the hot/cold air/air heat pump system 7, without waiting for the surplus electrical power production of the photovoltaic system 2 to be used up.

With regard to the operating mode "away from home", it is based on the assumption that the closed environment fills with people in the evening when the sun has set, so the management software is designed to leave the task of air conditioning the closed environment to the indoor units 9 of the hot/cold air/air heat pump system 7 during the day, and to switch on the water boiler 4 only when the surplus electrical power production of the photovoltaic system 2 has been used up.

In this way, during winter, on a sunny day, the indoor units 9 of the hot/cold air/air heat pump system 7 are switched on and off with a sequence programmed based on the surplus electrical power production of the photovoltaic system 2 with respect to the electrical power consumption of the electrical appliances 14 in the closed environment, on the electrical power consumption of each indoor unit 9 of the hot/cold air/air heat pump system 7, and on the switching on/off priorities. Thus, the various rooms of the closed environment will begin to heat up in the presence of sun, light and energy available. If the rooms cannot reach the set temperatures, the water boiler 4 will switch on and it will follow the same aforesaid operating mode based on the temperatures set on the thermostatic valves 6 of the radiators 5, which will then heat up just enough to bridge the differences in temperature reached by switching on the indoor units 9 of the hot/cold air/air heat pump system 7.

Naturally, enablement to switch on the water boiler 4 or not is also given by the (chrono)thermostats 11, but in any case the actual command is given by the PLC 16 which also follows the user's programming, comprising the setting of the operating mode "at home", "away from home" or "holiday".

With regard to the summer period, the automatic operating modes are the same, namely based on the switching on/off of the indoor units 9 of the hot/cold air/air heat pump system 7 based on the surplus electrical power production of the photovoltaic system 2 with respect to the consumption of the electrical appliances 14 in the closed environment, except, of course, on using the water boiler 4, which is only used to produce domestic hot water, which, if so desired, could also be produced by an ad hoc heat pump which may be operated to exclusively produce hot domestic water, only in summer or all year, based on the settings and also on the surplus electrical power production of the photovoltaic system 2. Cooling will be strictly during the daytime, so that the closed environment is brought to a fresh temperature in the day when it is sunny and when there is a considerable surplus electrical power production of the photovoltaic system 2.

Finally, it goes without saying that if there is no electrical power production of the photovoltaic system 2 or if there is an electrical power production, but not a surplus with respect to the electrical power consumption of the electrical appliances 14 in the closed environment, the management software is programmed to air condition the closed environment traditionally, namely by using the water boiler 4 of the radiator heating system 3 during winter and the indoor units 9 of the air/air heat pump system 7 during summer.

Finally, it is possible to provide a web version which requires a connection of the PLC to a local network, so that it is possible to access the PLC 16 remotely by a user terminal and through an Internet connection, so as to display the same information and make the same adjustments and settings as those, which can be displayed and made via the GUI displayed on the display 17 of the PLC 16. In particular, the web version is especially advantageous when, in the case of needing to return home earlier than planned, it is necessary to modify the implemented operating mode from "away from home" to "at home". In this case, it will be sufficient to set the operating mode "at home" by means of a smartphone, and the PLC 16 will bring the temperatures set for the various rooms of the environment to the values set on the (chrono)thermostats 11.

From the above description, the advantages which can be achieved with the present invention may be appreciated. In particular, in brief, the present invention allows the following objectives to be reached:

practically free summer air conditioning and domestic water production, free air conditioning and domestic water production during mid-seasons when it is sunny, winter heating and domestic water production with a very low use of the water boiler the more sunny days there are, 100% exploitation of the electrical power production of the photovoltaic system to cut not only the costs to be incurred to purchase the electrical power but, above all, the costs to be incurred for air conditioning, and this is implementable with a electrical power storage system, also to cover evening or night time electrical power consumption.

The invention claimed is:

1. An electronic control system for a joint water boiler-air/air heat pump air conditioning system coupled to a photovoltaic system and intended to air condition a closed environment formed by one or more rooms and comprising an electrical system to which electrical appliances are connected;
the joint water boiler-air/air heat pump air conditioning system comprising:
a radiator heating system comprising a water boiler to produce hot water, and one or more radiators intended to be installed in the rooms of the closed environment, fluidically connected to the water boiler to be flown through by the hot water produced by the water boiler, and equipped with thermostatic valves to set desired temperatures in the rooms of the closed environment in which they are installed; and
a hot/cold air/air heat pump system comprising one or more outdoor units intended to be installed outside the closed environment, and one or more indoor units intended to be installed in the rooms of the closed environment;
the electronic control system comprising:
one or more thermostats intended to be installed in one or more of the rooms of the closed environment to switch the water boiler on and off;
a network board associated with each indoor unit of the hot/cold air/air heat pump system to remote control operation of the associated indoor unit;
an electronic electrical power meter connected to the photovoltaic system, the electrical appliances in the closed environment, and public electrical power mains to measure electrical power production of the photovoltaic system and electrical power absorbed from, or supplied to, the public electrical power mains as a result of an electrical power underproduction or overproduction of the photovoltaic system with respect to the electrical power consumption of the electrical appliances in the closed environment; and
an electronic control unit connected to the thermostats of the water boiler, the network boards of the indoor units of the hot/cold air/air heat pump system, and the electronic electrical power meter, provided with a display through which a user can interact with the joint water boiler-air/air heat pump air conditioning system, and programmed to manage the joint water boiler-air/air heat pump air conditioning system based on the electrical power production of the photovoltaic system;
the electronic control unit being programmed to:
allow operating modes to be selected and operation of the joint water boiler-air/air heat pump air conditioning system to be programmed, and information on the operation of the joint water boiler-air/air heat pump air conditioning system to be displayed on the display;
allow switch on/off priorities and temperatures of the indoor units of the hot/cold air/air heat pump system to be programmed, receive data from the thermostats of the water boiler, the network boards of the indoor units of the hot/cold air/air heat pump system, and the electronic electrical power meter;
compute, based on the received data, electrical power production of the photovoltaic system and electrical power consumption of the electrical appliances in the closed environment and, based thereon, electrical power production of the photovoltaic system in surplus of the electrical power consumption of the electrical appliances in the closed environment; and
when a surplus of electrical power production of the photovoltaic system with respect to the electrical power consumption of the electrical appliances in the closed environment is determined to exist, switch on the indoor units of the hot/cold air/air heat pump system based on the surplus of electrical power production of the photovoltaic system with respect to the electrical power consumption of the electrical appliances in the closed environment.

2. The electronic control system of claim 1, wherein the electronic control unit is programmed:
when a surplus of electrical power production of the photovoltaic system with respect to the electrical power consumption of the electrical appliances in the closed environment is determined to exist, determine how many indoor units of the hot/cold air/air heat pump system can be electrically supplied simultaneously with the electrical power surplus;
when the surplus of electrical power production of the photovoltaic system with respect to the electrical power consumption of the electrical appliances in the closed environment is determined to be enough to electrically supply one or more indoor units of the hot/cold air/air heat pump system simultaneously, check whether there are indoor units of the hot/cold air/air heat pump system that are scheduled to be simultaneously switched on; and
if there are indoor units of the hot/cold air/air heat pump system that are scheduled to be simultaneously switched on, switch on those indoor units of the hot/cold air/air heat pump system that are scheduled to be switched on based on the programmed switch on priorities and in a number no greater than the maximum number of indoor units of the hot/cold air/air heat pump system that can be electrically supplied simultaneously with the electrical power surplus of the photovoltaic system.

3. The electronic control system of claim 1, wherein the electronic control unit is further programmed to allow hierarchical selections to be made and comprises:
a main selection between a manual operating mode and an automatic operating mode,
in the automatic operating mode, a secondary selection between a heating mode, a cooling mode and a dehumidification mode, and
both in heating mode and in cooling mode, a tertiary selection between an operating mode suitable for when people are present in the closed environment, an operating mode suitable for when no people are present in the closed environment, and a specific operating mode for exploiting only the electrical power production of the photovoltaic system.

4. The electronic control system of claim 3, wherein the electronic control unit is further programmed to switch on the indoor units of the hot/cold air/air heat pump system based on the electrical power surplus of the photovoltaic system both in the heating mode and in the cooling mode.

5. The electronic control system of claim 3, wherein in the automatic operating mode suitable for when people are present in the closed environment, the electronic control unit is further programmed to:
- check whether temperatures set on the thermostats can be reached in a predetermined period of time using only the indoor units of the hot/cold air/air heat pump system,
- in the affirmative, maintain the water boiler switched off and switch an only the indoor units of the hot/cold air/air heat pump system, and
- in the negative, to switch on both the water boiler and the indoor units of the hot/cold air/air heat pump system, also in the presence of a surplus of electrical power production of the photovoltaic system with respect to the electrical power consumption of the electrical appliances in the closed environment.

6. The electronic control system of claim 3, wherein in the automatic operating mode suitable for when no people are present in the closed environment, the electronic control unit is further programmed to:
- air condition the closed environment using only the indoor units of the hot/cold air/air heat pump system during the day, and
- switch on the water boiler only when the electrical power surplus of the photovoltaic system has been used up.

7. A non-transitory machine-readable storage medium comprising instructions stored therein, the instructions, when executed by one or more processors of an electronic control system, causing the one or more processors to perform operations of the electronic control system as claimed in any one of the preceding claims.

* * * * *